United States Patent
Mossman

(10) Patent No.: US 12,366,837 B2
(45) Date of Patent: Jul. 22, 2025

(54) TRIM MANAGEMENT SYSTEM

(71) Applicant: Guy E Mossman, Charleston, SC (US)

(72) Inventor: Guy E Mossman, Charleston, SC (US)

( * ) Notice: Subject to any disclaimer, the term of this patent is extended or adjusted under 35 U.S.C. 154(b) by 0 days.

(21) Appl. No.: 17/670,432

(22) Filed: Feb. 12, 2022

(65) Prior Publication Data

US 2023/0259085 A1    Aug. 17, 2023

(51) Int. Cl.
 *G05B 17/00*    (2006.01)
 *G05D 1/00*    (2024.01)

(52) U.S. Cl.
 CPC ............ *G05B 17/00* (2013.01); *G05D 1/048* (2013.01); *G05D 1/0875* (2013.01)

(58) Field of Classification Search
 CPC ...... G05B 17/00; G05D 1/048; G05D 1/0875; G05D 2111/50; G05D 2111/52; G05D 2111/60; G05D 2111/63; G05D 2111/64; G05D 2109/30; G05D 2109/34; G05D 2109/36; B63B 79/00; B63B 79/10; B63B 79/40; B63B 39/00; B63B 39/40
 See application file for complete search history.

(56) References Cited

U.S. PATENT DOCUMENTS

| | | | |
|---|---|---|---|
| 6,088,653 A * | 7/2000 | Sheikh | G01S 19/55 701/472 |
| 6,474,159 B1 | 11/2002 | Foxlin et al. | |
| 8,261,682 B1 * | 9/2012 | DeVito | G05D 1/0875 701/21 |
| 9,278,740 B1 * | 3/2016 | Andrasko | G05D 1/0875 |
| 10,677,926 B2 | 6/2020 | Mossman | |
| 2005/0012642 A1 * | 1/2005 | Sacle | G01C 23/005 340/973 |
| 2005/0251300 A1 * | 11/2005 | Hellvik | B63B 39/14 701/33.4 |
| 2008/0246627 A1 * | 10/2008 | Guazzelli | H04Q 9/00 340/870.02 |
| 2010/0297896 A1 * | 11/2010 | Duncan | B63H 23/321 440/52 |
| 2011/0151732 A1 * | 6/2011 | Chiecchi | B63H 20/08 701/21 |
| 2014/0114509 A1 * | 4/2014 | Venables | B63B 39/06 701/21 |
| 2014/0338441 A1 * | 11/2014 | Sutherland | B63B 35/42 73/170.31 |
| 2018/0273144 A1 * | 9/2018 | Skidmore | B63B 79/30 |
| 2018/0341729 A1 * | 11/2018 | Kowalyshyn | B63B 79/20 |
| 2021/0394875 A1 * | 12/2021 | Atherton | B63B 79/10 |
| 2022/0073173 A1 * | 3/2022 | Breijs | B63B 27/10 |

* cited by examiner

*Primary Examiner* — Aaron L Troost
(74) *Attorney, Agent, or Firm* — Merek, Blackmon & Voorhees, LLC

(57) ABSTRACT

A system and method for providing accurate trim and list angles of a ship through an array of sensors incorporating real-time kinematics and inertial measurement units. The software application would create a D model of the localized sensor data for detailed ship characteristics. Artificial intelligence will process all the sensor data through a large database of route data, weather conditions, and past performances to determine the optimum ballast levels to set the trim/list angles for maximum fuel efficiency. Each trip will provide detailed course information for continual improvement.

9 Claims, 4 Drawing Sheets

TRIM MANAGEMENT SYSTEM

FIELD OF THE INVENTION

The present invention is directed to a system including an apparatus and a method for monitoring the trim of a boat or ship. This invention is particularly suited for use on large oceangoing ships to maintain proper trim to maximize stability of the ship as well as fuel efficiency and speed.

BACKGROUND OF THE INVENTION

In order for ships to maximize their efficiency and stability it is important to maintain proper trim of the vessel. The ship trim is the difference between the forward draft and the aft draft. This ensures that the ship is stable. A ship's draft is the vertical distance from ship bottom to water plane. According to different parts of a ship, the draft can consist of six sides: fore draft of port side, fore draft of starboard side, mid-draft of portside, mid-draft of starboard side, aft draft of portside, aft draft of starboard side. A ship's trim can also be described as the difference between the fore draft (the average of fore drafts of portside and starboard side) and the aft draft (the average of aft drafts of portside and starboard side). When the fore draft is greater than the aft draft, it is called trimmed by bow; when the fore draft is smaller than the aft draft, it is called trimmed by stern; when the fore draft is the same as the aft draft, it is called trimmed on even keel. A ship's draft will directly affect the underwater penetration of the propeller and rudder blades, and will also affect its velocity through the water, maneuverability and seakeeping performance. In practice, when ships sail in port waters and shallow channels, in order to reach the maximum cargo loading capacity and meet the port requirements, ships are normally adjusted to trim on the even keel. Taking into account the speed performance, the propulsion efficiency, the rudder efficiency and the maneuvering flexibility, trim by stern is usually used when a ship is sailing at sea.

However, the calculation is not simple as many technicalities are involved in the calculation of optimum trim. The optimum trim operation refers to the operation of keeping the ship in optimum trim state when the ship travels at sea. Optimum trim can be divided into static optimal operation and dynamic optimal operation. Static optimal operation means the adjustment of optimum trim when the ship is docked, such as during cargo handling and before a ship's departure. Dynamic optimal operation refers to the real-time or intermittent adjustment when the ship is moving in order to keep the ship in the optimum trim state during the entire voyage. Determining the center of flotation is important to maintaining the stability of the ship.

A ship that is not properly balanced (trim and list) will create drag and/or poor power delivery. These inefficiencies lead to increased time and increased fuel usage costing extra money. Conventionally, a ship is trimmed using sight gauges while at dock. Once at sea, the trim and list will change due to fuel usage, weather, and sea conditions. Adjustments while underway are slow and sight gauges do not provide proficient level indications to make accurate adjustments. Maximizing fuel efficiency by employing optimum trim angles could save tons of fuel, improve transit time, and provide additional safety indicators.

OBJECTS AND SUMMARY OF THE INVENTION

An object of a preferred embodiment of the present invention is to provide novel and unobvious methods and/or apparatus for providing trim management assistance for a ship.

Another object of a preferred embodiment of the present invention is to provide an apparatus that is designed to provide trim management data by measuring and calculating trim angle measurements.

Yet another object of a preferred embodiment of the present invention is to provide weighted trim angle data using a plurality of methods of determining trim angle data.

Still a further object of a preferred embodiment of the present invention is to provide digital filtering to mitigate erroneous trim angle readings.

Yet another object of the invention is to provide an array of sensor modules positioned throughout a ship.

Still another object of the invention is to provide a computer program for optimizing fuel consumption and speed of a ship.

Another object of a preferred embodiment of the present invention is to provide a system for networking multiple vessels.

A further object of a preferred embodiment of the present invention is to provide tactile sensory augmentation to provide feedback to crew members.

It must be understood that no one embodiment of the present invention need include all the aforementioned objects of the present invention. Rather, a given embodiment may include one or none of the aforementioned objects. Accordingly, these objects are not to be used to limit the scope of the claims of the present invention.

In summary, the invention provides accurate trim and list angles of a ship through an array of sensors incorporating real-time kinematics and inertial measurement units. The software application creates a 3D model of the localized sensor data for detailed ship characteristics. Artificial intelligence will process all the sensor data through a large database of route data, weather conditions, and past performances to determine the optimum ballast levels to set the trim/list angles for maximum fuel efficiency. Each trip will provide detailed course information for continual improvement.

One method to calculate trim angle is by using 3-axis accelerometers. Two accelerometers laid flat in the same orientation will indicate the same acceleration readings of gravity. As one accelerometer changes position, the gravitational angle of incidence changes causing that accelerometer to provide a different acceleration reading. Using trigonometry, this difference can be calculated as an angle. A second method of calculating trim angle is by using multiband GNSS (Global Navigation Satellite System) receivers with correctional data for real-time kinematics. Since absolute position is not important for this second method of calculation, relative positions around 1 cm are easily achievable. By placing antennas in multiple locations, a 3D model of 1 cm accuracy can be digitally drawn 10 times a second. This model can be used to determine relative position differences used to calculate trim and list.

Using both methods to calculate the trim angle, the solution can be refined further by using a weighted average based on a confidence level of each calculation. Other accelerations (such as changes in movement) can affect accelerometer readings. As acceleration readings move away from gravity, confidence in the trim angle calculation decreases, and more weight is given to the GNSS calculation. As high cloud cover increases or inclement weather strikes, confidence in the GNSS reading decreases and more weight is given to the accelerometer calculation.

To mitigate erroneous readings, digital filters are applied based on expected movements, terrain, confidence, rates of change, and other factors. Filtering is both an automated task based on previous data and current information as well as taking manual inputs to help ensure the confidence of the trim system remains high. Accelerometers are used to help detect the terrain and expected rate of changes to anticipate expected readings. Other external sensors can be used in tandem to further refine and filter readings.

To setup the trim management system, an array of sensor modules is placed throughout the vessel. The more sensor modules, the higher the accuracy thus higher confidence in each reading. Each sensor module contains an accelerometer, multiband GNSS receiver, and radio transceiver to broadcast the module information. All data is transmitted to a central hub to compile and process the data. This central hub is preferably directly wired to a computer (or laptop) running an application to accurately model the vessel and sensor readings at each location. It should be understood that various forms of wireless transmission, i.e. Wi-Fi, Bluetooth, could also be used.

Other sensors on each sensor module can help filter readings. Each sensor module can preferably also contain a 3-axis gyroscope and 3-axis magnetometer for position filtering. Additional time-of-flight sensing is done to verify distances and determining initial conditions at start-up. Environmental factors (temperature, humidity, pressure, wind) and RF signal strength are also recorded to help determine expected forces, air quality, and sensor accuracy. The use of available vessel sensors will also be compiled to further help calculate the dynamics and calibrations of the system.

Using the software program to model the vessel, various inputs can be optimized. For example, fuel consumption can be put in a control system to determine the te best trim angle based on the generated model and sensor readings. Speed can be optimized by changing orientation based on current conditions. More sensors can be added to create a detailed 3D gradient of information to verify operating conditions. Additional information can be obtained or information can be transmitted using an internet connection 46.

Multiple vessels may be linked together, if desired, to share detailed the modeling information. This information can be used as sensor correction data, model information prediction, estimate course over time, or to avoid potential collisions. Accurate waypoint navigation from beacons or relative base stations (known distance from a station) can also provide accurate modeling or facilitate a course with virtual boundaries and gates.

A vessel's crew may have portable equipment used as feedback to aid completing a task. A tactile headband requests the vessels information to apply a varying level of pressure at a specific location on the crew member's head. This pressure could relate to upcoming waypoint, other vessels, current speed and direction, imminent danger, or any other useful information needed by the crew to optimally complete the mission at hand. An example of a tactile headband is described in U.S. Pat. No. 10,677,926 issued Jun. 9, 2020 which is incorporated herein by reference in its entirety.

The use of all the sensors together makes many redundant calculations providing different possible solutions with varying confidence levels. These potential solutions can all be mapped together at each point in time by taking every combination of each calculation and fusion calculation across different sensor platforms into a machine learning computer to create the most accurate result based on the highest confidence level. The machine learning core would remember these possible solution points to then perform the next set of calculations from each of the previous solution points to have the ability to "undo" calculations and create a new calculation path of convergence to the most likely final result.

DETAILED DESCRIPTION OF THE PREFERRED EMBODIMENTS OF THE INVENTION

Figure 1:
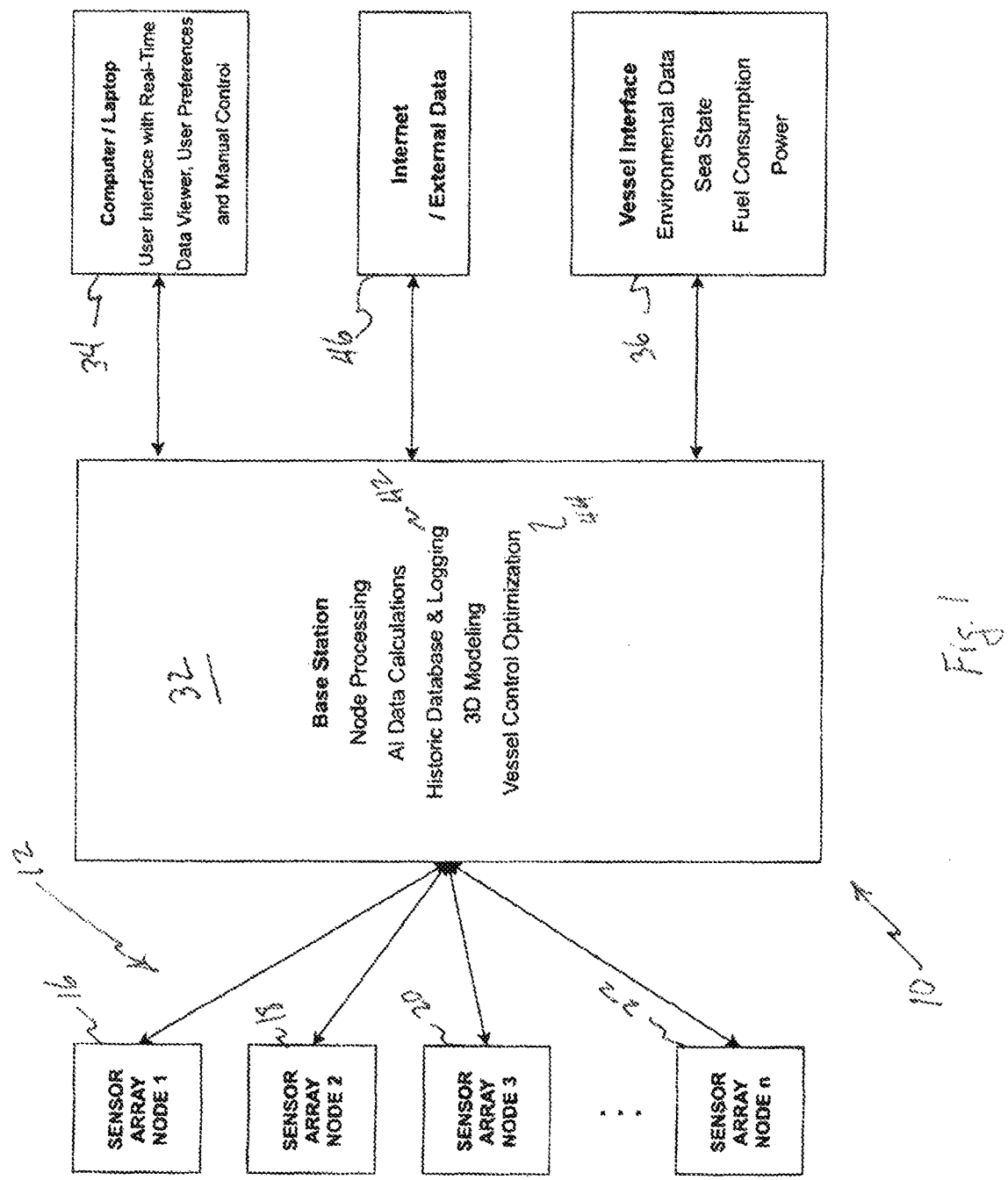
FIG. 1 shows a trim management functional block diagram.
Figure 2:
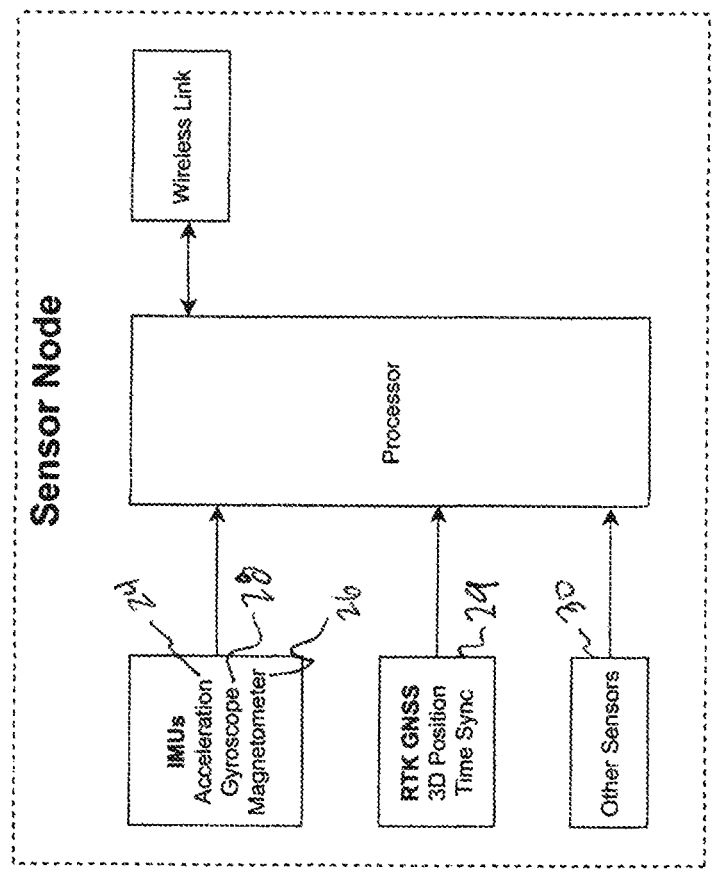
FIG. 2 shows a sensor node block diagram.

FIG. 1 shows a Trim Functional block diagram including a first data acquisition system 10 which collects data from sensor array nodes 16, 18, 20 and 22 positioned at predetermined locations throughout the ship. The number of sensor array nodes may vary depending on the size of the ship and/or the degree of accuracy desired. As shown in FIG. 2, each of the sensor array nodes 16, 18, 20 and 22 include an accelerometer and a magnetometer and a gyroscope and a processor positioned throughout a ship for acquiring and transmitting acceleration data 24, magnetometer data 26 and gyroscope data 28. A second data acquisition system 29 includes GNSS data which is acquired by placing a GNSS receiver at each sensor array node. Each of the sensor array nodes 16, 18, 20 and 22 can also include other sensors 30 such as time of flight to further enhance accuracy of trim measurements. Referring back to FIG. 1, the collected data from the sensor array nodes 16, 18, 20 and 22 is transmitted to the base station 32.

Figure 3:
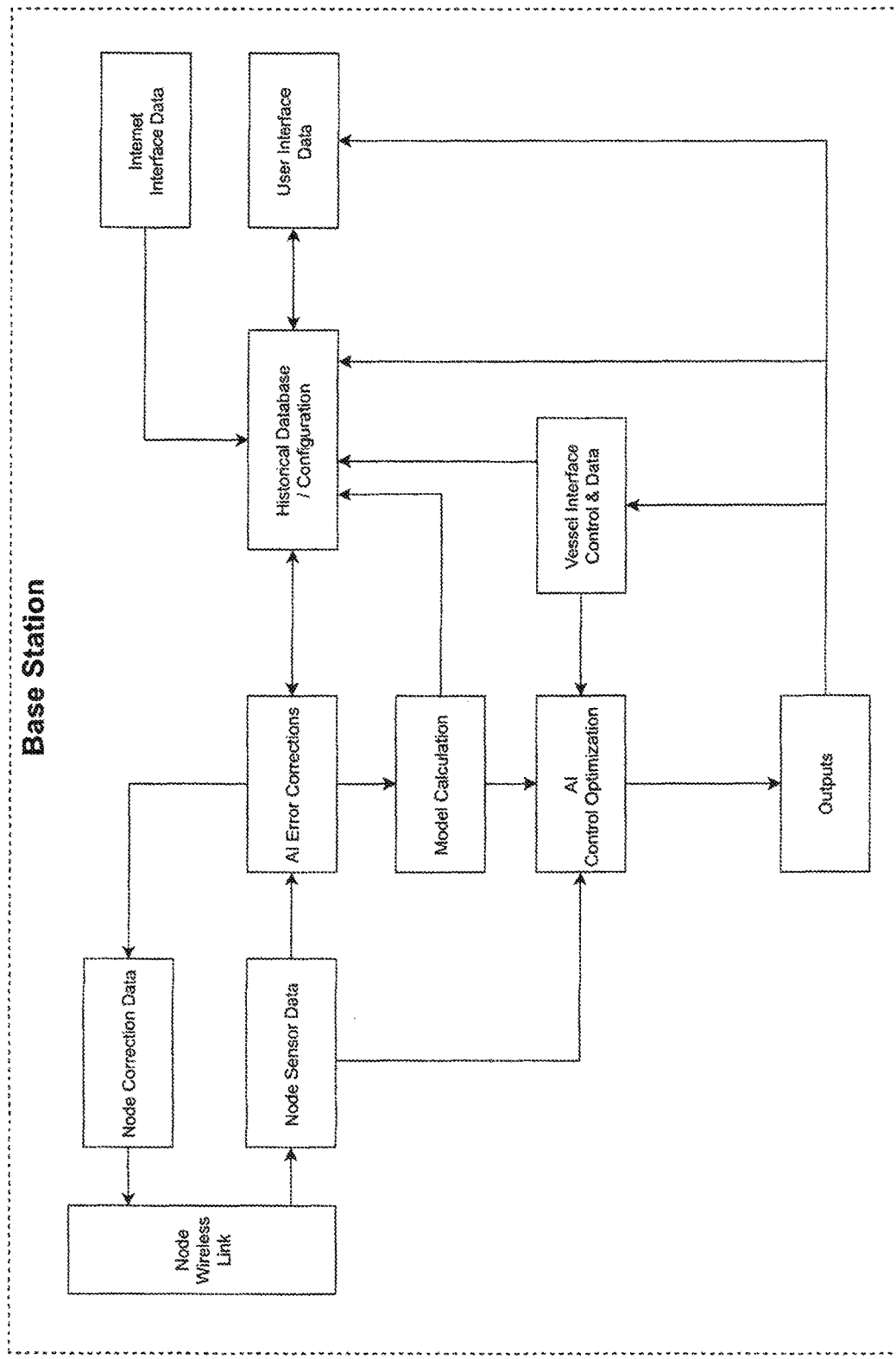
FIG. 3 shows a base station block diagram.

As shown in FIGS. 1 and 3, the base station 32 includes a data processer for processing collected data from the sensor array nodes as well as processing artificial intelligence data calculations, storing the historic database and logging, 3D ship modeling and vessel control optimization. As shown in FIG. 1, the base station 32 is connected to a user interface 34 and a ship interface 36. The user interface 34 may be either a fixed or portable computer and includes a user interface with a real-time data viewing screen and a keypad for inputting user preferences and to provide for manual control. Additionally, ship information can be collected from the ship interface 36 which can include environmental factors such wind speed and direction, temperature and precipitation information, as well as fuel consumption, and sea state such as wave height, wave direction and wave period. The base station 32 compiles and processes the ship information and the data from the sensor network 12 and using a computer processor creates a historical database 42 and a data model and a control optimization feature 44 to supply optimum trim data to the user.

FIG. 3 shows a the base station flow chart identifying the processing steps to produce the user interface data for viewing by the user.

Using the software program to model the vessel, various inputs can be optimized. For example, fuel consumption can be put in a control system to determine the te best trim angle based on the generated model and sensor readings. Speed can be optimized by changing orientation based on current conditions. More sensors can be added to create a detailed 3D gradient of information to verify operating conditions.

Additional information can be obtained, or information can be transmitted, as shown in FIG. 1, using an internet connection 46.

Figure 4:
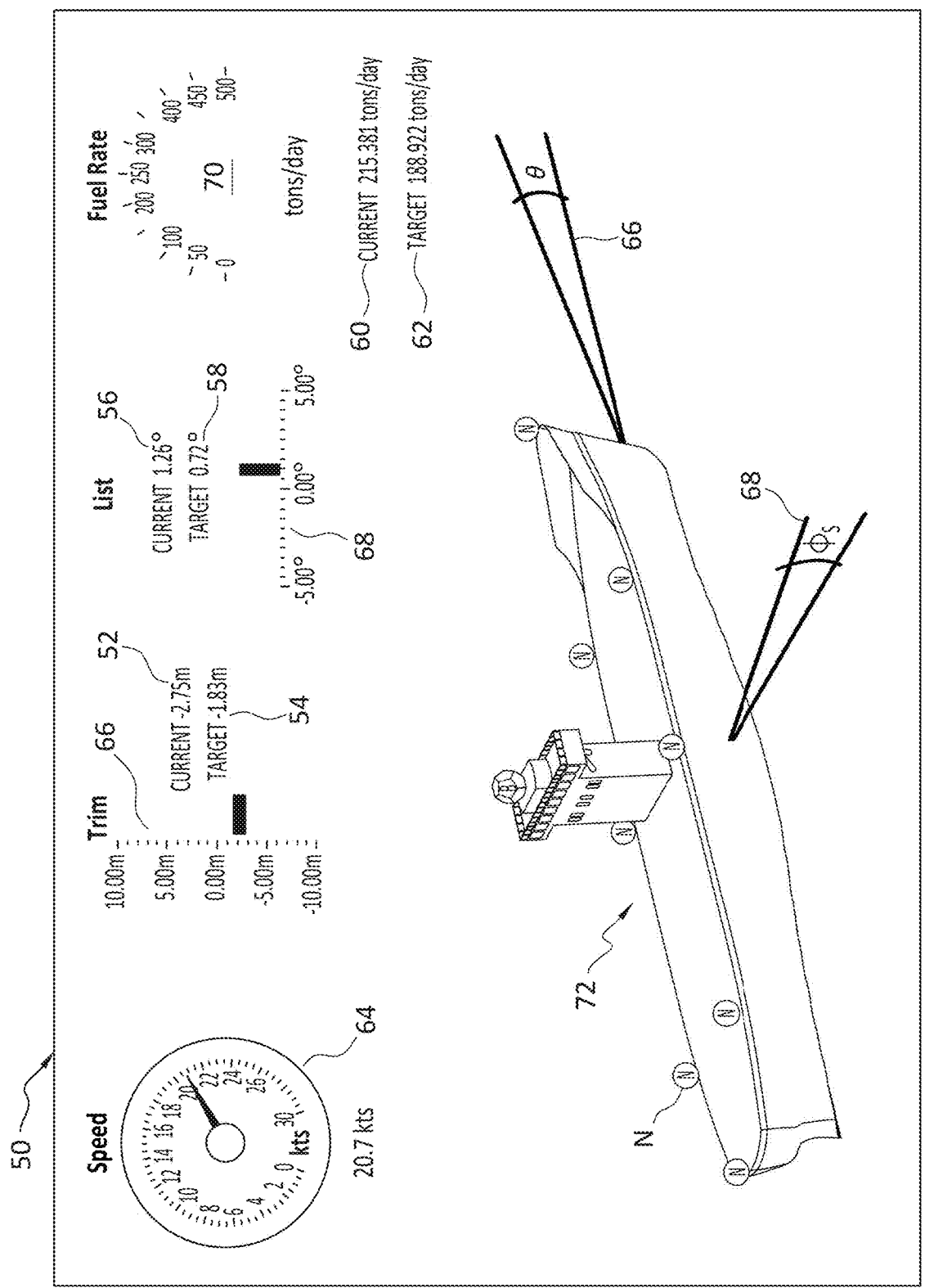
FIG. 4 shows a graphical user display window of a 3D illustration and data.

FIG. 4 is an example of a display 50 on graphical user interface. The display can include a current trim window 52, a target trim window 54, a current list window 56, a target list window 58, a current fuel consumption window 60 and a target fuel consumption window 62. Other windows can also be displayed including a speedometer window 64 and graphical charts representing trim status 66, list status 68 and fuel consumption 70. A 3D model of the ship 72 graphically showing current trim status can also be displayed. The location of individual nodes N of the sensor array can also be shown on the display. The display may also be interactive to bring up node operational status and data from each node.

While this invention has been described as having a preferred design, it is understood that it is capable of further modifications, uses and/or adaptations of the invention following in general the principle of the invention and including such departures from the present disclosure as come within the known or customary practice in the art to which the invention pertains and as maybe applied to the central features hereinbefore set forth, and fall within the scope of the invention and the limits of the appended claims.

The invention claimed is:

1. A method for adjusting a dynamic operational trim of a ship during a voyage, comprising:
    a) placing a plurality of trim sensors in a spaced apart relationship on the ship;
    b) determining and storing a first trim of the ship, wherein the first trim of the ship is a dynamic optimal operational trim of the ship during a voyage and then subsequently determining at least a second trim of the ship based on data from the plurality of trim sensors during the voyage;
    c) determining when adjustment of the dynamic operational trim of the ship during the voyage is needed by comparing the first trim of the ship with the second trim of the ship to determine if the first trim of the ship is different from the second trim of the ship; and,
    d) making adjustments to the ship to obtain the first trim of the ship based on determination that adjustment of the dynamic operational trim of the ship is needed,
    wherein placing a plurality of trim sensors in a spaced apart relationship on the ship includes placing a sensor a fore draft of port side, a fore draft of starboard side, a mid-draft of portside, a mid-draft of starboard side, an aft draft of portside, an aft draft of starboard side.

2. The method for adjusting a dynamic operational trim of a ship during a voyage as set forth in claim 1, further comprising the steps of:
    a) installing a gyroscope in at least a first trim sensor;
    b) collecting gyroscope data from said first trim sensor; and
    c) using said gyroscope data to determine if the ship is operating at the first trim.

3. The method for adjusting a dynamic operational trim of a ship during a voyage as set forth in claim 1, further comprising the steps of:
    a) installing a magnetometer in at least a first trim sensor;
    b) collecting magnetometer data from said first trim sensor; and
    c) using said magnetometer data to determine if the ship is operating at the first trim.

4. The method for adjusting a dynamic operational trim of a ship during a voyage as set forth in claim 1, further comprising the steps of:
    a) installing an accelerometer in at least a first trim sensor;
    b) collecting accelerometer data from said first trim sensor;
    c) determining when a change occurs in the accelerometer data from at least one of said at least a first trim sensor; and,
    d) using said accelerometer data to determine if the ship is operating at the first trim.

5. The method for adjusting a dynamic operational trim of a ship during a voyage as set forth in claim 1, further comprising the steps of:
    a) installing a GNSS receiver in at least a first trim sensor;
    b) collecting GNSS data from said first trim sensor;
    c) determining when a change occurs in the GNSS data from said at least a one of said first trim sensor; and,
    d) using said GNSS data to determine if the ship is operating at the first trim.

6. The method for adjusting a dynamic operational trim of a ship during a voyage as set forth in claim 1, wherein making adjustments to the ship includes changing a speed of the ship.

7. The method for adjusting a dynamic operational trim of a ship during a voyage as set forth in claim 1, wherein making adjustments to the ship includes changing a heading of the ship.

8. The method for adjusting a dynamic operational trim of a ship during a voyage as set forth in claim 1, wherein making adjustments to the ship includes determining optimum ballast levels of the ship.

9. The method for adjusting a dynamic operational trim of a ship during a voyage as set forth in claim 1, wherein a determined difference between the first trim and the second trim is based at least in part on fuel consumption during the voyage.

* * * * *